United States Patent
Pope et al.

(10) Patent No.: US 11,044,183 B2
(45) Date of Patent: *Jun. 22, 2021

(54) NETWORK INTERFACE DEVICE

(71) Applicant: XILINX, INC., San Jose, CA (US)

(72) Inventors: Steven L. Pope, Costa Mesa, CA (US);
David J. Riddoch, Fenstanton (GB);
Derek Roberts, Cambridge (GB)

(73) Assignee: XILINX, INC., San Jose, CA (US)

(*) Notice: Subject to any disclaimer, the term of this patent is extended or adjusted under 35 U.S.C. 154(b) by 94 days.

This patent is subject to a terminal disclaimer.

(21) Appl. No.: 14/983,263

(22) Filed: Dec. 29, 2015

(65) Prior Publication Data

US 2017/0187589 A1    Jun. 29, 2017

(51) Int. Cl.
| | | |
|---|---|---|
| *H04L 12/26* | (2006.01) | |
| *G06F 15/167* | (2006.01) | |
| *H04L 12/823* | (2013.01) | |
| *H04L 1/00* | (2006.01) | |
| *H04L 29/08* | (2006.01) | |
| *H04L 1/18* | (2006.01) | |

(52) U.S. Cl.
CPC ............ *H04L 43/08* (2013.01); *H04L 1/0082* (2013.01); *H04L 1/1867* (2013.01); *H04L 69/323* (2013.01); *H04L 69/324* (2013.01)

(58) Field of Classification Search
CPC .................................................... H04L 51/12
See application file for complete search history.

(56) References Cited

U.S. PATENT DOCUMENTS

| | | | | |
|---|---|---|---|---|
| 5,195,093 A | * | 3/1993 | Tarrab ..................... | G06F 11/10 714/703 |
| 5,331,318 A | * | 7/1994 | Montgomery .......... | E21B 47/12 340/855.4 |
| 5,459,723 A | * | 10/1995 | Thor ....................... | H04L 29/06 370/392 |
| 5,732,094 A | * | 3/1998 | Petersen ................ | G06F 13/128 370/445 |
| 6,167,032 A | * | 12/2000 | Allison ................... | H04L 29/10 370/252 |
| 6,330,241 B1 | | 12/2001 | Fort | |

(Continued)

FOREIGN PATENT DOCUMENTS

| | | | |
|---|---|---|---|
| EP | 1896965 A1 | 3/2008 | |
| EP | 2871580 A1 | 5/2015 | |
| WO | WO-2006058050 A2 * | 6/2006 | ............. H04L 7/048 |

OTHER PUBLICATIONS

EP 16206191.5—Extended European Search Report dated Mar. 23, 2017, 7 pages.

(Continued)

*Primary Examiner* — Nicholas R Taylor
*Assistant Examiner* — Sanjoy Roy
(74) *Attorney, Agent, or Firm* — Haynes Beffel & Wolfeld LLP; Andrew L. Dunlap; Paul A. Durdik

(57) ABSTRACT

A network interface device, said network interface device has a data transmission path configured to receive data for transmission. The data for transmission is to be sent over a network by the network interface device. A monitor is configured to monitor the data transmission path to determine if an underrun condition is associated with the data transmission path. If so, an indication is included in the transmitted data packet.

18 Claims, 8 Drawing Sheets

(56) References Cited

U.S. PATENT DOCUMENTS

| | | | |
|---|---|---|---|
| 6,401,146 B1* | 6/2002 | Lee | G06F 13/385 709/236 |
| 6,434,165 B1* | 8/2002 | Sherer | H04L 1/0061 370/465 |
| 6,643,719 B1* | 11/2003 | Baker | G06F 5/06 710/33 |
| 6,993,602 B2 | 1/2006 | Merrill et al. | |
| 8,751,881 B1* | 6/2014 | Terry | H04L 1/0044 714/708 |
| 8,930,557 B2 | 1/2015 | Pope et al. | |
| 9,043,671 B2 | 5/2015 | Pope et al. | |
| 2003/0152095 A1 | 8/2003 | Foore et al. | |
| 2004/0078812 A1 | 4/2004 | Calvert | |
| 2004/0100966 A1* | 5/2004 | Allen, Jr. | H04L 1/0072 370/395.1 |
| 2008/0307127 A1 | 12/2008 | Alankry et al. | |
| 2009/0067431 A1* | 3/2009 | Huang | H04L 49/90 370/394 |
| 2012/0207215 A1 | 8/2012 | Ryu et al. | |
| 2013/0208593 A1 | 8/2013 | Nandagopal | |
| 2013/0235753 A1 | 9/2013 | Kovacs et al. | |
| 2015/0127763 A1 | 5/2015 | Pope et al. | |
| 2016/0205029 A1 | 7/2016 | Sugunadass | |
| 2017/0070440 A1 | 3/2017 | Hardt et al. | |

OTHER PUBLICATIONS

U.S. Appl. No. 15/385,644—Office Action dated Oct. 5, 2018, 31 pages.

U.S. Appl. No. 15/385,644—Final Office Action dated Feb. 12, 2019, 23 pages.

U.S. Appl. No. 15/385,644—Response to Office Action dated Oct. 5, 2018 filed Jan. 16, 2019, 19 pages.

U.S. Appl. No. 15/385,644—Resposne to Final Office Action dated Feb. 12, 2019 filed May 10, 2019, 11 pages.

U.S. Appl. No. 15/385,644—Advisory Action dated May 2, 2019, 3 pages.

U.S. Appl. No. 14/983,263—Response to Final Office Action dated Jun. 13, 2019 filed Aug. 13, 2019, 14 pages.

U.S. Appl. No. 15/385,644—Office Action dated Jan. 9, 2020, 14 pages.

U.S. Appl. No. 15/385,644—Response to Office Action dated Jan. 9, 2020, filed Apr. 9, 2020, 15 pages.

U.S. Appl. No. 15/385,644—Office Action dated May 6, 2020, 17 pages.

U.S. Appl. No. 15/385,644—Resposne to Office Action dated May 6, 2020, filed Jul. 6, 2020, 12 pages.

U.S. Appl. No. 15/385,644—Supplemental Resposne to Office Action dated May 6, 2020, filed Aug. 5, 2020, 19 pages.

\* cited by examiner

NETWORK INTERFACE DEVICE

FIELD OF THE INVENTION

This application relates to a network interface device.

BACKGROUND OF THE INVENTION

Various methods are known in the art for transmitting data from a host system over a network. One such method is Direct Memory Access (DMA) in which data is transferred across the network independently of the central processing unit (CPU) of the host system. Another method is Programmed Input/output (PIO) in which data is transferred between the CPU and a network endpoint.

When performing data transfer over a network, using either DMA or PIO, data processing systems typically make use of a network interface device. Before transferring data from a network interface device onto a network, data must be temporarily stored in a buffer prior to being transmitted onto the network. In some cases, problems may occur with buffer underrun, where the buffer is being fed with data at a lower speed than the output data rate. This may be an issue with low latency applications which initiate the transmission of a frame as soon as the first data bytes are available. Buffer underrun may lead to the corruption of the transmitted data packets.

SUMMARY

In an aspect there is a provided a network interface device, said network interface device comprising: a data transmission path configured to receive data for transmission, said data for transmission to be sent over a network by said network interface device; and a monitor configured to monitor said data transmission path to determine if an underrun condition is associated with said data transmission path.

The network interface device may be configured to be coupled to source of said data for transmission.

The source of said data may comprise one or more of a host computing device and a source on said network interface device. The source on said network interface device may be a processor on the network interface device.

In response to determination of said condition, the monitor may be configured to cause an indication to be provided in a packet which is to be transmitted, said packet comprising at least some of said data for transmission.

The indication may cause said packet to be discarded by a receiver of said packet.

The indication may indicate that said packet is invalid.

The indication may indicate that said packet has been deliberately marked as invalid.

The indication may be provided by one or more bits of a cyclic redundancy check

The indication may be provided by modifying one or more bits of a cyclic redundancy check The indication may be provided by a known value.

A network interface device may further comprise a medium access control function, and the monitor may be configured to cause said medium access control function to cause said indication to be provided in said packet.

A network interface device may further comprise a physical layer function and the monitor may be configured to cause said physical layer function to cause said indication to be provided in said packet.

The monitor may be configured to cause said data for transmission to be retransmitted.

The monitor may be configured to only cause said retransmission if there is no underrun condition associated with the data transmission path for the data to be retransmitted.

The network interface device may comprise a queue, said queue comprising information associated with the data to be transmitted.

The network interface device may comprise consumer queue information comprising a pointer which is incremented in response to transmission of a packet, wherein said monitor is configured to cause the pointer not to be incremented if said packet to be transmitted comprises said indication.

The monitor may be configured to determine an underrun condition associated with said transmit data path in response to one of: a data rate of data being received being less than a threshold rate; or a quantity of data in said data transmission path being less than a threshold amount.

The said data transmission path may comprise a buffer, said data transmission path being configured such that transmission of data starts when at least N bytes of data is in said buffer.

The buffer may be configured such that the value of N is adjustable.

The buffer may be configured such that the value of N is adjustable in response to at least one occurrence of an underrun condition.

A frame may be received using load store operations to the said transmit data path, which may be configured to drain at a rate dependent on a network link speed.

A network interface device may be configured to delay transfer of data through said data transmit path for at least one of a predetermined time and until predetermined amount of data has been received.

According to another aspect, there is provided a network interface device, the network interface device comprising: a buffer for receiving data for transmission over the; and a buffer monitor configured to determine an underrun condition associated with said buffer, and in response to the determination of said underrun condition to cause an indication to be provided in a packet which is to be transmitted.

According to an aspect, there is provided a receiver comprising: an input configured to receive data packets over a network; and a packet checker, said packet checker configured to determine for each packet if said packet comprises an indication, said indication indicating that said packet has been deliberately corrupted and to discard any packet with said indication.

According to an aspect, there is provided a system comprising a host apparatus and a network interface device such as described previously. The host apparatus may comprising a function which is configured to write data to a buffer or template. The buffer or template may be in memory associated with the host apparatus and/or memory associated with the network interface device. The host apparatus may comprise a send queue. The host apparatus may be configured to write a doorbell to the network interface device.

According to an aspect, there is provided a method comprising: receiving data for transmission, said data for transmission to be sent over a network by a network interface device; and monitoring said data for transmission to determine if an underrun condition is associated with said data for transmission.

The method may comprise receiving the data from a source of said data. The source of said data may comprise one or more of a host computing device and a source on said network interface device.

The method may comprise in response to determination of said underrun condition, causing an indication to be provided in a packet which is to be transmitted, said packet comprising at least some of said data for transmission.

The indication may cause said packet to be discarded by a receiver of said packet The indication may cause said packet to be discarded by a receiver of said packet.

The indication may indicate that said packet is invalid.

The indication may indicate that said packet has been deliberately marked as invalid.

The indication may be provided by one or more bits of a cyclic redundancy check

The method may comprise modifying one or more bits of a cyclic redundancy check

The indication may be provided by a known value.

The method may comprise causing a medium access control function to provide said indication in said packet.

The method may comprise causing a physical layer function to provide said indication in said packet.

The method may comprise causing said data for transmission to be retransmitted.

The method may comprise only causing said retransmission if there is no underrun condition associated with the data transmission path for the data to be retransmitted.

The method may comprise incrementing a pointer of a queue in response to transmission of a packet, or not incrementing said pointer if said packet to be transmitted comprises said indication.

The method may comprise determining an underrun condition in response to one of: a data rate of data being received being less than a threshold rate; and a quantity of data in said data transmission path being less than a threshold amount.

The method may comprise starting transmission of data when at least N bytes of data is in a buffer.

The method may comprise adjusting the value of N.

The method may comprise adjusting the value of N in response to at least one occurrence of an underrun condition.

The method may comprise receiving a frame using load store operations to a transmit data path, and draining the transmit data path at a rate dependent on a network link speed The method may comprise delaying transfer of data for at least one of a predetermined time and until predetermined amount of data has been received.

BRIEF DESCRIPTION OF DRAWINGS

Embodiments of the application will now be described by way of example with reference to the accompanying drawings, in which.

DETAILED DESCRIPTION

Various modifications to the disclosed embodiments will be readily apparent.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
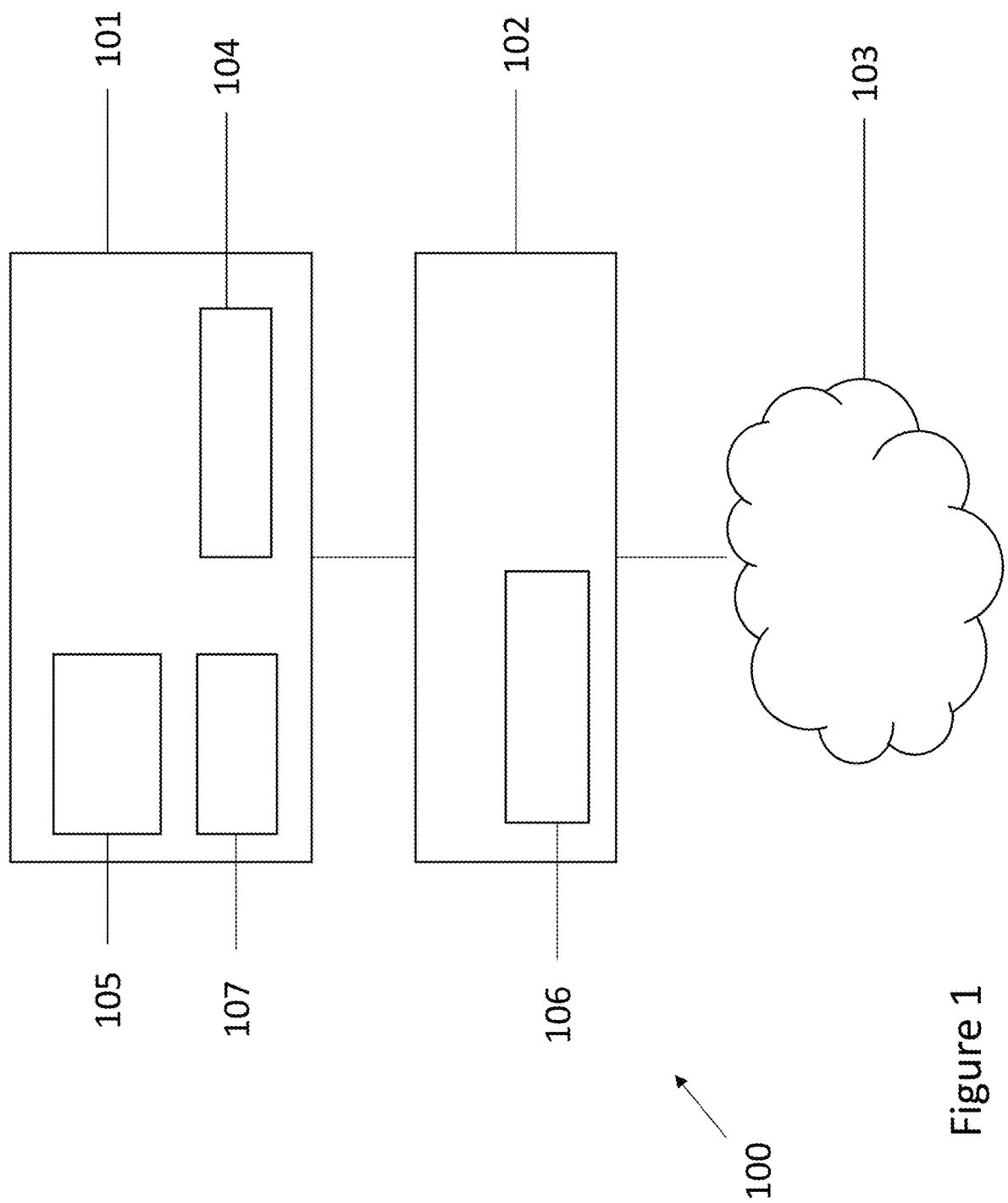
FIG. 1 is a schematic diagram of a typical data processing system configured to transmit data packets over a network.

A typical data processing system 100 for carrying out transmission across a network is shown in FIG. 1. The data processing system 100 comprises a host computing device 101 coupled to a network interface device 102 that is arranged to interface the host to network 103. The host computing device may include an operating system 104 supporting one or more user level applications 105 and a network protocol stack (not shown). For example, the protocol stack may be a component of the application, a library with which the application is linked, or the operating system. In some embodiments, more than one protocol stack may be provided.

The host computing device 101 may comprise one or more processors and one or more memories. In some embodiments, the host computing device 101 and the network interface device 102 may communicate via a bus, for example a peripheral component interconnect express (PCIe bus).

During operation of the data processing system, data to be transmitted onto the network may be transferred from the host computing device 101 to the network interface device 102 for transmission. In one example, data packets may be transferred from the host to the network interface device directly by the host processor. The host may provide data to one or more buffers 106 located on the network interface device 102. The network interface device 102 may then prepare the data packets and transmit them over the network 103.

Alternatively, the data may be written to a buffer 107 in the host system 101. The data may then be retrieved from the buffer 107 by the network interface device and transmitted over the network 103.

In both of these cases, data is temporarily stored in one or more buffers prior to transmission over the network.

Some embodiments relate to the transmission of data over a network from a data processing system. A data processing system could be any kind of computing device, such as a server, personal computer or handheld device. Some embodiments may be suitable for use in networks that operate TCP/IP over Ethernet. In other embodiments one or more different protocols may be used. Embodiments may be used with any suitable networks, wired or wireless.

Buffer 106 may be any suitable memory, a FIFO, or set of registers. The buffer may be such that any operations which require modifications to the frame (for example checksum insertion into headers) are completed before that portion of the frame is transferred to the MAC (media access control).

Network interface devices have been previously proposed which employ store and forward buffering so that transfer of a frame to the MAC does not start unless the entire frame is available in a buffer within the network interface device. The checksum offload of common protocols such as TCP/UDP/IP may require store and forward operation because these protocols have checksums in the headers of the packet.

However for low-latency operation, transmission of a frame at the MAC may be initiated as soon as the first data bytes are available. Any checksum information which is required in frame headers may be calculated in advance such as by host software. However there may be issues for the transfer of data from the host to the network interface device. It is possible that the start of a frame has arrived at the network interface device and is presented to the MAC for transmission before the entire of the frame has been received from the host (over the PCI bus for example). Once a packet starts to be fed into the MAC/PHY for transmission any cause of delay to the process of transferring a frame to the network interface device will result in an underflow situation. For low latency operation, the transfer of frame data to the network interface device may be made using processor input/output or load-store instructions rather than DMA.

It may be desirable to perform transmit operations from a user-space application directly (rather than using the operating system) and so there may be no control of external events such as interrupts which might cause a thread (and hence transmission) to be interrupted. Even if the operating system is transmitting, or if DMA is being employed then an underflow situation may still occur, for example if the hardware (PCI bus/memory) bandwidth is transiently unable to keep up, or if the bus stalls or enters a low-power state for any reason during the transfer.

It should also be noted that checksum (or cyclic redundancy check) information which is included at the tail of the frame (for example the Ethernet FCS) may be calculated in a cut-through manner since this information is only required after all other frame information has been received.

Some embodiments may be particularly suitable for use at a data processing system and network interface device (NIC). Some embodiments may be used in low latency applications where a MAC may start transmission before the complete packet for transmission has been received.

Figure 2A:
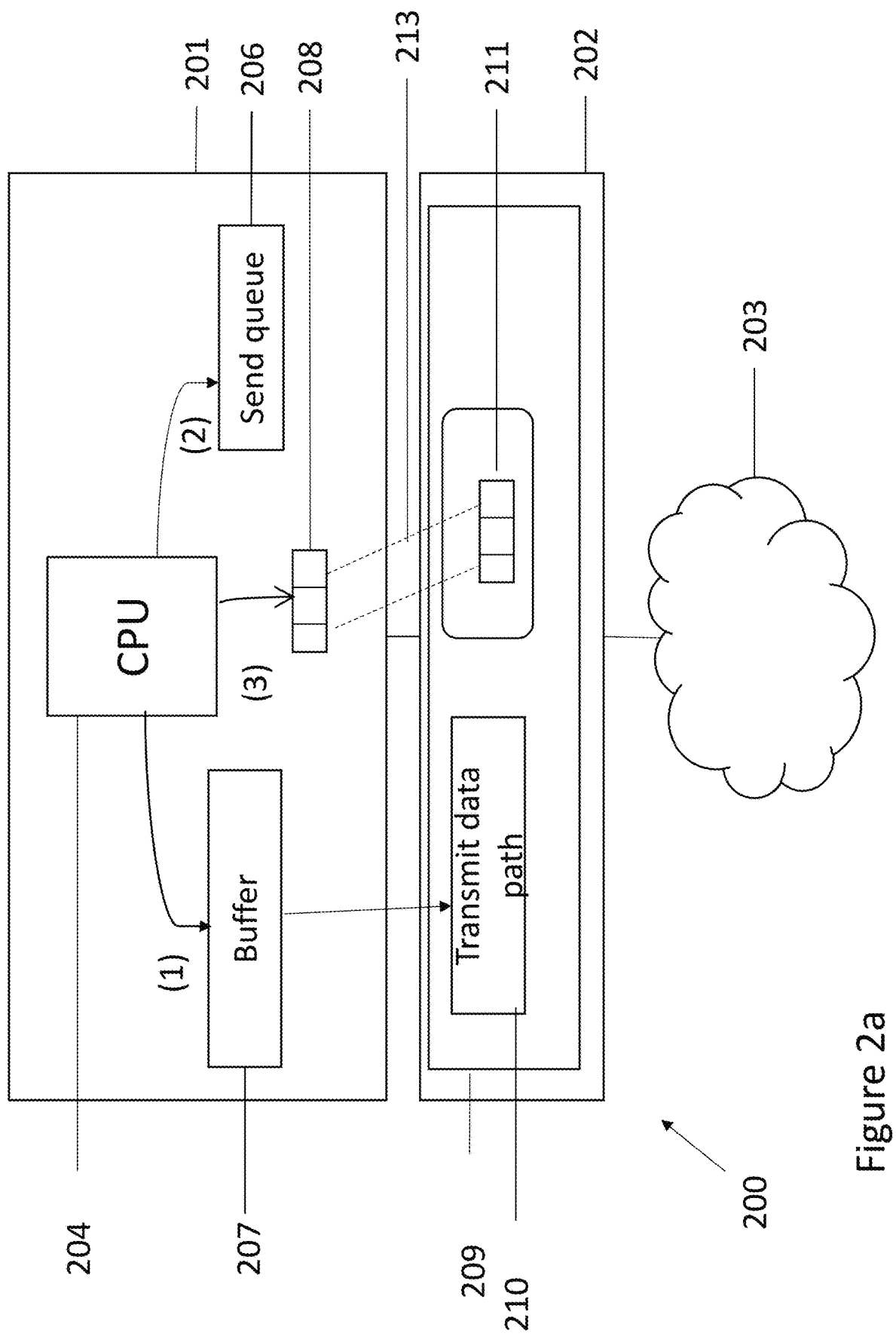
FIG. 2a is a schematic diagram of a data processing system according to an embodiment using DMA.

A data processing system 200 including a host system 201 and a network interface device 202 configured in accordance with an embodiment using DMA is shown in FIG. 2a. The data processing system is connected to a network 203 over which data is transmitted to one or more endpoints, e.g. a peripheral device, a remote server or another data processing system. The network may, for example, be a local area network (LAN), wide area network (WAN), or virtual private network (VPN).

The host system 201 comprises one or more processors 204 configured to run one or more user level processes. Alternatively or additionally one or more applications may reside in the operating system. One or more of these user level processes, applications and/or the host system may request transmission of data over the network 203. The host system further comprises a memory 207 for storing data which is to be transferred to the network interface device 202 for transmission over the network 203. This memory may comprise a buffer. For example, data may be written to the buffer by a user level application or host operating-system directly (known as zero-copy) or via an API (application programming interface) such as POSIX (portable operating system interface) sockets which requires a copy into the buffer.

Any buffer which can be placed onto a send queue may be DMA accessible by the network interface device. Memory-mapping to the network interface device address space may be used where a CPU is required to issue store operations for data (or management or doorbell operations) to the network interface device.

The host system 201 further comprises a send queue 206 which is also written to by the application. Each entry provides a descriptor which provides a pointer to respective data in the buffer 207 in host memory. The system may comprise one or more send queues. Where more than one queue is provided, a respective queue identity is provided as part of an entry. In some embodiments, the or each queue may comprise a descriptor ring.

The host system 201 may also comprise one or more doorbells 208, used to signal to the network interface device 202 that data is available in the buffer 207. The doorbell may comprise an index or similar value indicating an entry in the send queue in which associated descriptors have been written. In one embodiment, the index value may identify a descriptor ring of said plurality of descriptor rings in which data has been written to and optionally a position in the descriptor ring (for example an offset).

The network interface device 202 could be any hardware device configured to interface the wired or wireless network 203 to the host computing device 201. The network interface device could be provided in any manner between a network and host device, including: as one or more peripheral devices (such as a peripheral component interconnect express (PCIe) card) of the host computing device, and/or as an integral part of the host computing device (e.g. a LAN on mainboard, or LAN on motherboard (LOM) chipset). The network interface device may comprise a network interface controller or network interface card (NIC). The network interface device may be separate from the host computing device or may be integrated in the host computing device. For example, the network interface device may be integrated with a CPU (central processing unit) of the host computing device.

The network interface device comprises a processing pipeline 209, including a transmit data path 210. The transmit data path may comprise or include a buffer. The processing pipeline will be described in more detail later. The processing pipeline may process the data which has been retrieved from, for example, the host buffer 207 and which is to be transmitted onto the network. The network interface may optionally comprise a doorbell 211.

If the network interface device 202 comprises a doorbell 211, this doorbell 211 may be memory mapped to address region 208. For example, the user level process writing the doorbells 208 effects a write of the doorbell to a doorbell area of memory 211 of the network interface device 202. After writing data packets to the buffer or memory 207 of the host system 201, the processor or user application 204 then writes a doorbell, which indicates to the network interface device 202 that data is available for transmission. As noted, the doorbell may comprise an index value, which points to an entry in the send queue 206. The doorbell may include other information such as a pointer to the first buffer on the queue; and/or some or all of the frame data contained within the buffer. The network interface device 202, in response to the doorbell then processes the one or more descriptors in the queue pointed to by the index value and retrieves any required data pointed to by the descriptor from the buffer 207 for transmission over the network 203. If the doorbell contained data then not all of the buffer needs to be fetched.

FIG. 2a illustrates the steps carried out when transferring data from the host system to the network interface device. These steps are labelled (1), (2), and (3). Step (1) involves writing the data to the buffer 207. Step (2) involves writing the descriptors to send queue 206. Step (3) involve writing a doorbell to the network interface device 202 to signal to the network interface device that data in memory 207 is available for transmission. A fourth step involves reading the descriptor from the send queue memory and retrieving the corresponding data from the buffer 207.

At step (1), the processor writes the data to be transmitted over the network to the buffer 207.

At step (2) the processor 204 writes a descriptor for the transmit operation to send queue 206 of the host system 201. The descriptor comprises a pointer, which identifies the location in memory of the data buffer 207. The descriptor may additionally comprise information—e.g. type of transmit operation, address of network endpoint to which data is to be sent—which enables the transmit operation to be carried out. The descriptor may also comprise a queue identity and/or a request that the network interface device perform additional processing such as transmit segmentation offload.

Step (3) may also be included in the method. In this case, after writing one or more descriptors to the send queue memory 206, the processor 204 rings the doorbell by writing a doorbell to the doorbells 208 to indicate that one or more data packets are available for reading from the buffer 207.

In a fourth step, the network interface device 202 processes the one or more descriptors that have been written to the send queue 210. When processing a descriptor, the network interface device accesses the memory 207 and retrieves the data pointed to by the descriptor. This data may then be staged in the transmit data path before it is transmitted over the network. In some embodiments, the processing pipeline will process the data before the data is transmitted.

Figure 2B:
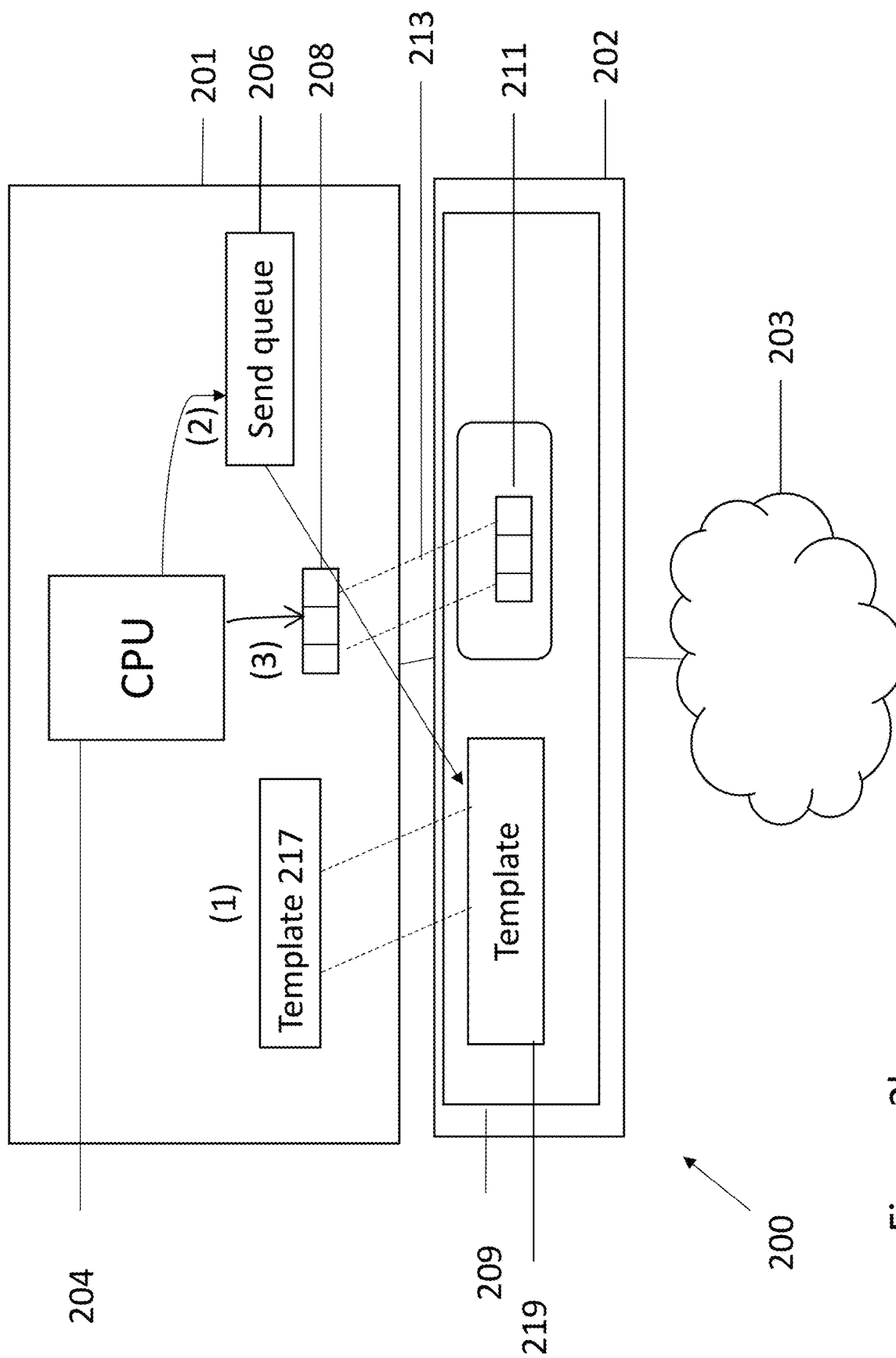
FIG. 2b is a schematic diagram of a data processing system according to an embodiment using PIO.

Reference is made to another embodiment which is shown in FIG. 2b and which uses a PIO mode of operation. Those parts which are generally the same as in FIG. 2a are referenced with same reference number. The data processing system 200 includes a host system 201 and a network interface device 202. The data processing system is connected to a network 203.

The host computing device 210 of FIG. 2b comprises a descriptor ring or send queue 206, doorbell 203 and a template 217. It will be appreciated that the send queue 206 and the doorbell 208 may be similar to those described with reference to FIG. 2a. The template 217 may be a region of memory that is memory mapped to the address space of the user-level process requesting the data transfer. For example, in some embodiments, the doorbell 208 and the template 217 may be regions of memory of the network interface device and memory mapped to the user level process.

Doorbell 211 and template 219 shows the memory region of the network interface device 202 where the doorbell and template are stored, while the doorbells 208 and template 217 shows the memory mapping to the address space accessible by the user level process. It will however be appreciated that this is by of example only and the memory may be mapped so that the user level process and the network interface device have access to shared memory.

The template 219 exists on the network interface 202 but is memory mapped to the address space of the user level process shown as template 217. The template may be owned by software running on the host computing device, for example the user level process or end-point. In some embodiments the template may be the size of one or more maximum transmission unit (s), for example a transmission frame. The template may for example hold multiple frames so that software can pipeline transmissions. The software (in some examples the user level process, operating system or hypervisor driver context) may have access to the template via the memory mapping as described above or any other appropriate means.

The software may write data which is intended for transmission to the template and form a descriptor pointing to the template on the host computing device. The descriptor may be written by the software to the descriptor ring. The descriptor is then available to be read by the network interface device and to indicate to the network interface device that data for transmission is available in a template to which the descriptor points.

Each user level process (or other software carrying out PIO transfers) may be associated with one or more templates into which data may be written. A descriptor may point to the data in the template. The descriptor may identify the template to which the data was written and in some cases may include an offset when the data is written to only part of the template. For example a template may be the size of more than one transmission unit and the descriptor may identify the template as well as indicate where in the template the data was written to. In this manner, the network interface device may be made aware when new data is written to the template.

The operation of the host computing device 201 and network interface device 202 of FIG. 2b is shown by steps (1), (2) and (3) of that figure.

At step 1, when data on the host device is available for transmission, the user level process may write that data to a template 217. The user level process (or other software) may write the data using programmed input/output. For example load/store operations may be carried out by the CPU of the host computing device to write the data to the template on the network interface device.

At step 2, a descriptor is written to the send queue 206. The descriptor points to or references the template and optionally an offset to which the data was written via PIO. It will be appreciated that the template may be associated with the descriptor ring. The descriptor may be written to the descriptor ring as soon as the PIO write to the template is initiated. In other words, the descriptor need not be written only when the PIO operation is complete, however in some cases this may be the case.

It will appreciated that the PIO and DMA operations described with reference to FIGS. 2a and 2b may be combined for a given send queue in which case the order by which frames are transmitted is given by the order of descriptors of any type were placed on the send queue.

At step 3 a doorbell is written to the doorbell 211 via the memory mapping 213. It will be appreciated that this may be similar to the doorbell of FIG. 2a. It will be appreciated that the address mappings of the doorbell and the template can be optimised to reduce the number of distinct transactions between the CPU and network interface device. It will be appreciated that the act of writing the doorbell can be rendered unnecessary in some embodiments since the network interface device may infer a doorbell simply from the arrival of frame data into a template.

If the host is writing to the network interface device (for example as discussed in relation to FIG. 2b) directly then the doorbell address space can just be extended so that there is an address mapping for PIO frame writes per send queue. This means that different send queues can be active at once and do not need locks to synchronise access. This may mean that there needs no longer be a distinct doorbell write. The PIO of the frame data is accepted as an implicit doorbell by the network interface device (which increments the send queue producer pointer).

Figure 3:
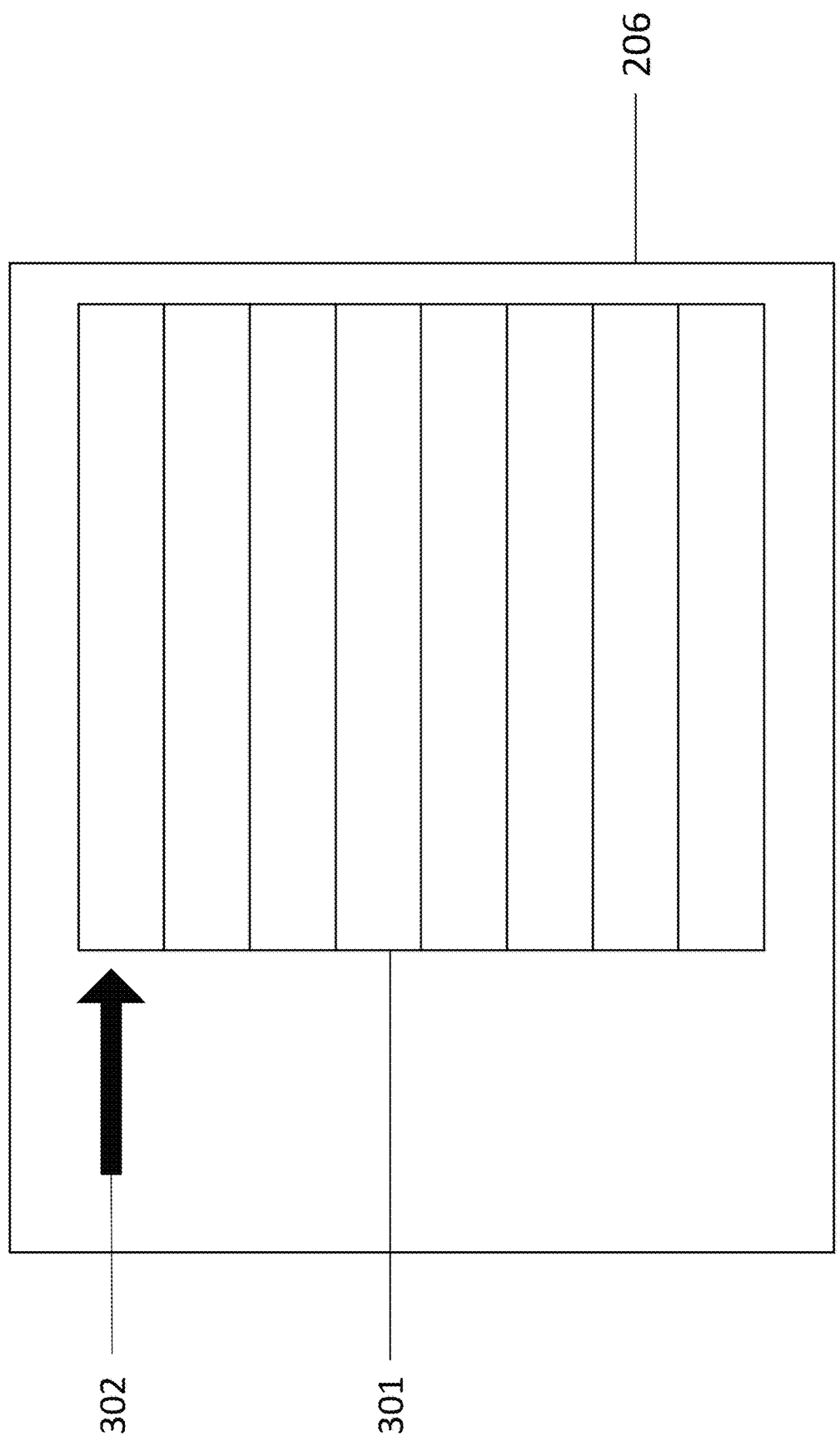
FIG. 3 is a schematic diagram of a queue according to an embodiment.

FIG. 3 illustrates an embodiment of the send queue 206 in greater detail. In this example, the send queue is provided by one or more buffers comprising a plurality of queues 301, each queue configured to store a plurality of descriptors. In some embodiments, each queue is provided by a ring buffer. In one embodiment, the send queue 206 further comprises a producer index 302. The host and the network interface device may track their respective producer and consumer indexes independently. The host may update its producer index and may indicates this to the network interface device via the doorbell. The network interface device updates its consumer index and indicates this to the host via a transmit completion event.

Figure 4:
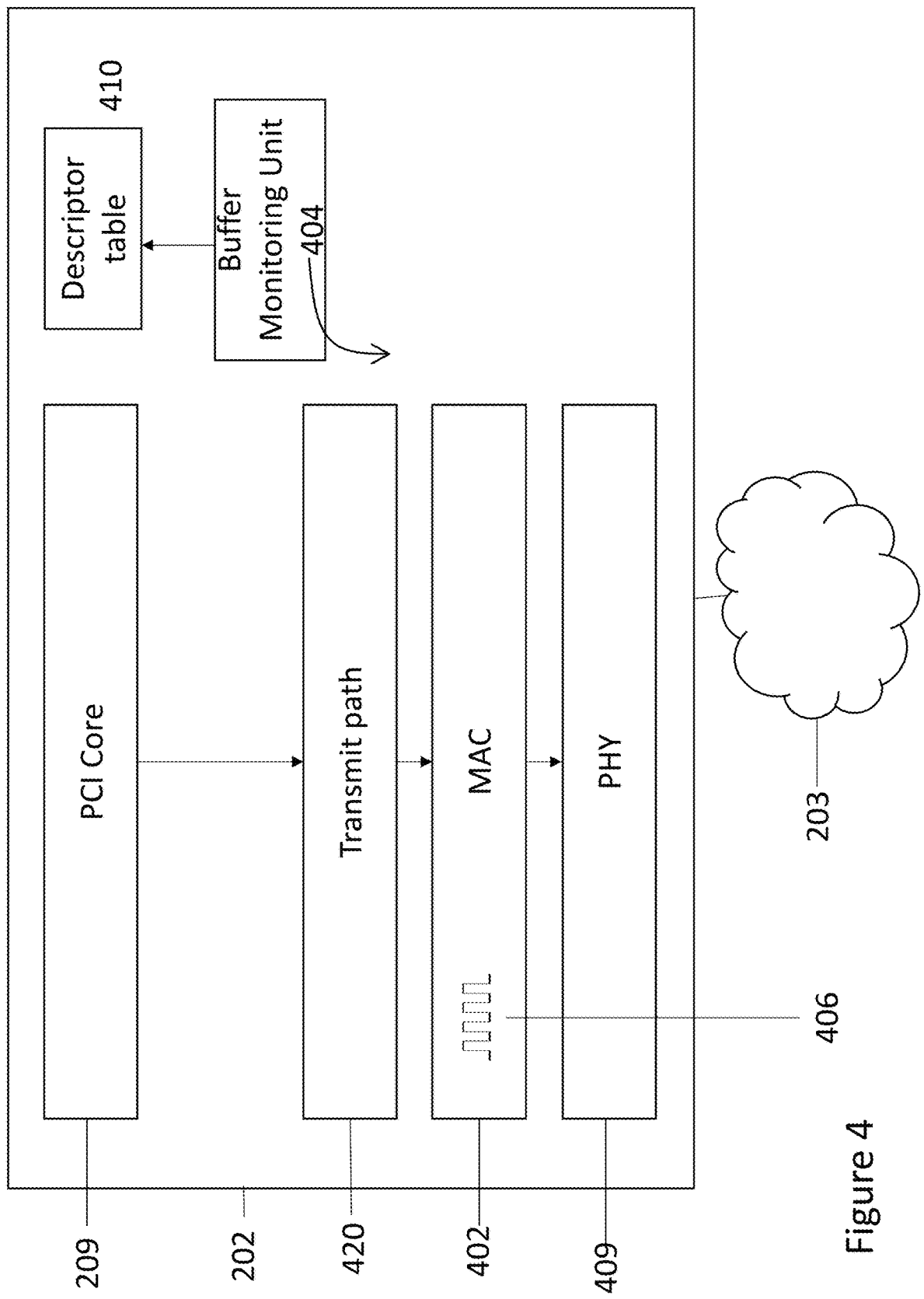
FIG. 4 is a schematic diagram of a network interface device according to an embodiment.

Reference is made to FIG. 4, which shows the network interface device 202 in more detail and in particular the processing pipeline. The network interface device further comprises a transmit data path (TXDP) 420, a media access controller (MAC) 402, a physical layer (PHY) 409, and a buffer monitoring unit 404. The transmit data path is where frames which are being transmitted are staged for transmission and operations such as TSO (TCP segmentation off-load)/checksum offload may take place. In some embodiments, there may be multiple buffers and multiple send queues which are arbitrated by a scheduler onto a set of transmission data paths which feed the MACs.

The transmission data path is one or more of logic, a FIFO, and CPUs which may be chained together and act to move the data on, after which the data is gone.

The network interface device may comprise a descriptor table 410 in order to keep track of the various send queues. More than one user application and/or host process may be in communication with the network interface device at the same time and the descriptor table allows the network interface device to keep track of each of the send queues in the host. Each send or transmit queue comprises a corresponding send queue identity which is used as an index in the descriptor table 410. The designated entry in the send queue descriptor table may be a starting point for describing the state and other characteristics of that particular transmit queue as viewed by the network interface device. The entry may comprise one or more of: whether the queue is a kernel queue (where descriptors reference bus physical addresses), user queue (where descriptors reference addresses which are directed through a page or buffer table) or another kind of queue: the size of the queue (number of send data buffer descriptors it can contain); the ID of an event queue associated with this send queue; a buffer identity of base buffer for this transmit queue; and "device centric" producer and consumer pointers into this send queue.

Each time a packet is transmitted from the network interface device, the consumer pointer to a respective queue is incremented to the next entry. The network interface device will then retrieve the data associated with the next entry in the queue.

The network interface device then obtains the physical address in host or IO bus memory address space of the current send data buffer. This physical address may be given directly by the buffer descriptor or the descriptor could be further indicated through tables within the network interface device or host memory. Then, using that physical address as a base, and the byte offset from the send descriptor queue entry as an offset, it determines the physical starting address in memory of the current data to be sent.

It should be appreciated that the send queue may to refer to buffers which are resident on the host and/or buffers on the network interface device.

The steps carried out after the network interface device 202 has received the data for transmission from the host system 201 are explained with reference to FIG. 4

The network interface device is configured to pass the data for transmission to the transmit data path 420 where the data is queued for transmission. The data is queued in the form of data packets or partial packets. The data packets are formed by performing protocol processing in accordance with the application-level protocol (as well as lower layer protocols, such as Ethernet) in order to form a completed message that is ready for transmission over the network. The necessary protocol processing may be performed in the host system 201, either in kernel or user mode. In this case the data stored in the memory 207 and retrieved by the host system is in the form of data packets. Alternatively or additionally, some or all of the protocol processing may be offloaded to the network interface device 202. In this case, the host system may transfer data which has not been packetized or data packets which are incomplete to the network interface device 202. The network interface device then processes the data and queues the resulting data packets in the buffer for transmission. This is where processing such as IP checksum offload and/or segmentation may take place.

The MAC 402 performs any necessary processing on the packets in the buffer. This may include, but is not limited to this, one or more of frame delimiting and recognition, checking error detection bits, discarding malformed frames, padding the data packet, timestamp insertion and calculation of the FCS (frame check sequence).

The PHY 409 or physical layer will transmit the data over the physical medium of the network, which may, for example, be an optical fibre or copper cable. The PHY 409 is preferably an Ethernet PHY configured to implement the Ethernet physical layer portion of the for example 1000BASE-T, 100BASE-TX, and 10BASE-T standards.

A clock signal is used coordinate the transmission of data. In one embodiment, the MAC 402 may comprise a clock generator, which is used to generate the clock signal. In another embodiment, the clock signal may be received over the network from an endpoint to which data is transmitted. The clock signal may, for example, coordinate data transmission by causing the MAC 402 to transmit the data over the network when the clock is at a high logic level.

Embodiments may make use of 10 Gigabit Ethernet technology for transmitting data across the network. The clock signal is therefore preferably configured to clock the data in the form of Ethernet frames from the network interface device unto the network at a rate of 10 gigabits per second. This data rate is by way of example only and higher or lower data rates may be supported.

Since the clock signal 406 is used to coordinate the transmission of data, the data is transmitted from the network interface device 202 at a constant rate (e.g. 10 Gb/s). This requires that the MAC 402 read data from the transmit data path 420 at a constant rate. Such a requirement may present a problem, since applications running on the processor 204 of the host system usually do not present data for transmission to the network interface device 202 at a constant rate. For example, a user level process of the host system 201 may request transfer of data, at a higher rate during a first time period, and then subsequently request transfer of data at a lower rate, during a second time period. This leads to a variation in the rate of receipt of data at the transmit data path 420.

If the rate at which data is received at transmit data path 420 is too low, such that the data is retrieved from the transmit data path 420 by the MAC at a higher rate that it is received at the transmit data path 420, a buffer underrun condition will occur. This requires the network endpoint device or program, which is receiving data from the data processing system 200, to pause its processing whilst the transmit data path 420 refills. This can cause undesired and sometimes serious side effects because the data being buffered is generally not suited to start-stop access of this kind. In particular the MAC/PHY specifications for Ethernet protocols do not allow for the transmission of a frame to be paused once transmission has been initiated and so underflow would cause a receiver to receive an invalid or a malformed frame which would be recognised as such and discarded.

Some embodiments address this problem by means of a buffer monitoring unit 404 provided as part of the network interface device 202. The buffer monitoring unit may be embodied in a purpose specific circuit in the network interface device 202. Alternatively, the buffer monitoring unit 404 may be a software module stored in a memory of the network interface device 202 and configured to run on a processor of the network interface device 202.

The buffer monitoring unit 404 is configured to monitor the transmit data path 420 to detect if there is underrun in the transmit data path. This may be determined by monitoring a buffer in the transmit data path. However, it should be appreciated that this is by way of example only and in other embodiments, the monitoring unit may be monitoring the transmit path as a whole or a non-buffer part of the transmit data path.

The buffer underrun condition may be determined by monitoring the amount of data stored in the transmit data path 420 as a proportion of the total capacity. For example, if the buffer monitoring unit detects that the transmit data path 420 is less than 5% full and a transmit to the MAC is in progress, the buffer monitoring unit may detect that an underrun condition will occur.

Alternatively or additionally, the buffer monitoring unit may monitor the rate at which the transmit data path 420 is receiving data from the host system 201 and may detect that an underrun condition will occur if the rate is too low.

In response to determining an underrun condition, the buffer monitoring unit 404 may cause modifications to the frame 403 by changing the value of one or more data bits of the frame. This may be implemented in any suitable manner. This may for example, depend on the MAC/PHY implementation. For example, if the MAC or PHY has the ability to mark the frame as bad (resulting from for example an error signal which is asserted to it during transmission by the buffer monitoring unit) then the buffer monitoring unit just needs to assert this signal on underrun. This may cause the MAC to corrupt its FCS calculation, or cause the PHY to deliberately include an error symbol in the line encoding. Alternatively the hardware in the network interface transferring the frame to the MAC might be calculating the FCS and it could corrupt the calculation if required. There are a number of ways of corrupting the FCS. For example, flipping the last bit of the bit sequence representing the frame as it is fed into the FCS calculator, replacing the FCS with a known value (or some bits of a known value to avoid the possibility of collision). Alternatively the frame data itself may be corrupted, or a tag may be added to the end of the frame data which marks the packet as bad (which may also ensure that the FCS is incorrectly calculated)

Figure 7:
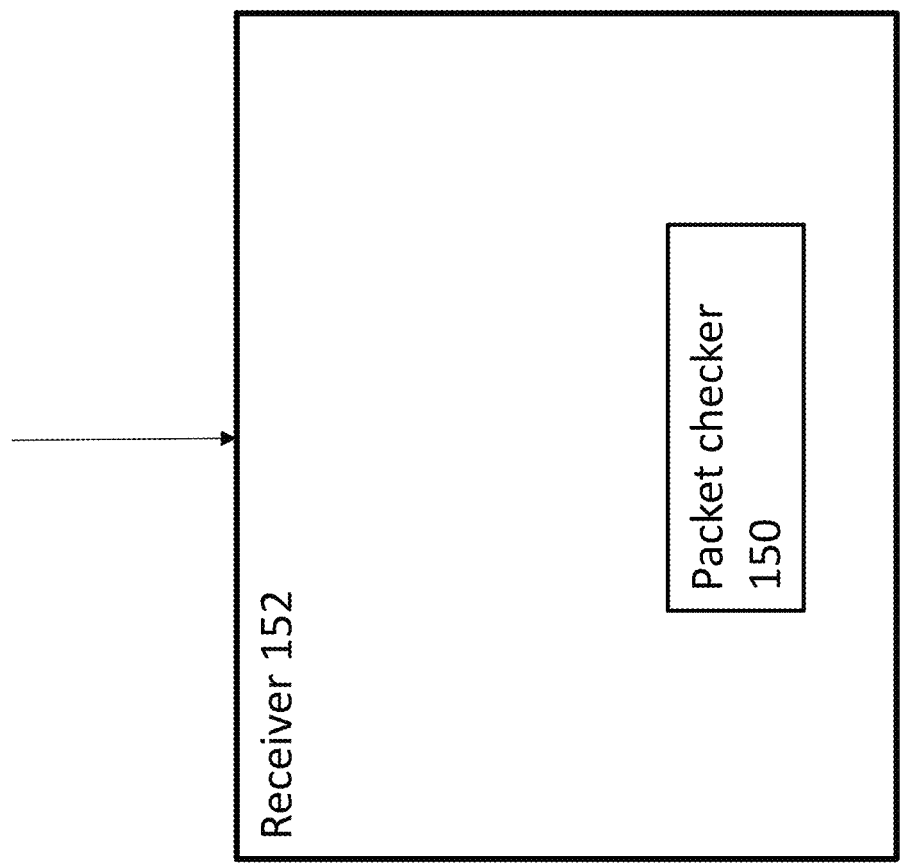
FIG. 7 schematically shows a receiving device.

Reference is made to FIG. 7 which schematically shows a receiver 152. The receiver is configured to receive the transmitted data packets from the network. A packet checker 150 is provided. It should be appreciated that in some embodiments, the packet checker is provided in a switch, router, network interface device and/or a host device. In some embodiments, the packet checker may be provided in the network interface device of FIG. 4 for dealing with received packets.

The packet checker will check the FCS value. In some embodiments, if the FCS value has been deliberately corrupted to have a particular value or particular bits to have a particular values, the packet checker will recognise the packet as being deliberately corrupted. The packet checker will discard the received packet as being a bad packet.

In this case, the received bad packet is correctly accounted for as being deliberately corrupted and transmitted rather than being caused by errors on the physical medium. Such accounting may be useful in some embodiments since administrators may monitor the error counts on physical links as an indicator that physical infrastructure (cables etc.) may need service/replacement. It will be appreciated that in the case of a deliberately corrupted packet the frame headers will not have been corrupted therefore it will be clearly apparent to administrators which host is emitting the underrunning frames.

The method will now be described in more detail with reference to FIGS. 5 and 6.

Figure 5:
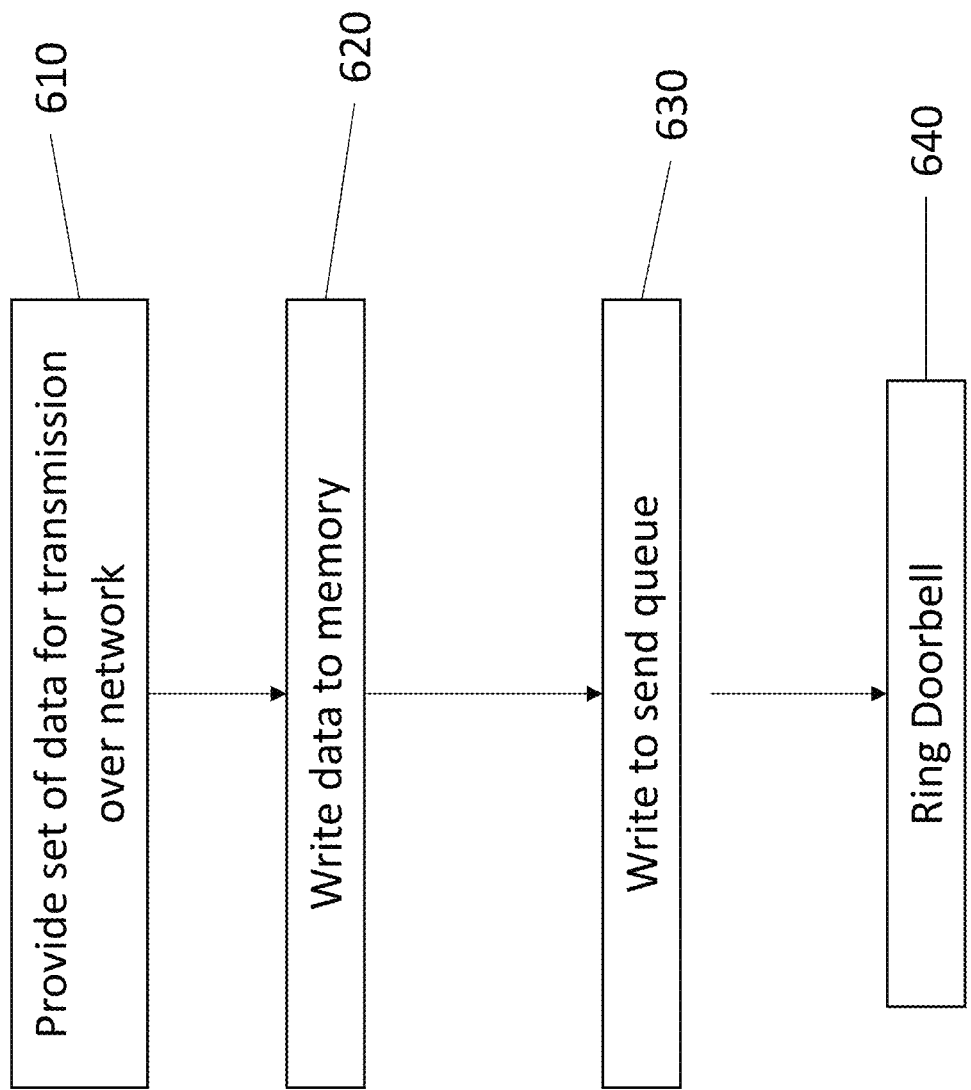
FIG. 5 is a flow chart illustrating data transfer from the host computing device to the network interface device.

Reference is made to FIG. 5, which shows a method of transferring a data packet for transmission from the host system 201 to the network interface device 202.

At step 610, a user level process or application running on one or more processors 204 of the host system 201 determines that a set of data is to be transmitted over the network 203. Applications running at computing devices on a network typically communicate over the network using an application-level protocol (such as HTTP or the Financial Information Exchange or FIX protocol) that define a series of structured data packets. In order to properly form each packet, the data for transmission must be processed in accordance with the application-level protocol (as well as lower layer protocols, such as Ethernet) in order to form a completed message that is ready for transmission over the network.

The necessary protocol processing may be performed in the host system 201, either in kernel or user mode. Alternatively or additionally, protocol processing may be offloaded to the network interface device 202. In this case, the host system may transfer data which has not been packetized or data packets which are incomplete to the network interface device 202.

At step 620, the processor 204 writes the data to a location in host or network interface device memory. This ensures that the frame exists in some persistent memory At step 630, the processor 204 writes to the send queue memory 206, one or more descriptors, which provide information necessary to enable the network interface device 202 to transmit data over the network. The one or more descriptors identify the location in memory of the data to be transmitted over the network.

At step 640, the processor writes doorbell 208 so as to indicate to the network interface device 202 that data is available for transmission. This doorbell write comprises all of the frame data which was written in step 620 together with any metadata such as frame length which is required by the network interface device transmit path to immediately process the frame data and initiate transmission onto the network without requiring that the network interface device then read the one or more descriptors from the queue.

Figure 6:
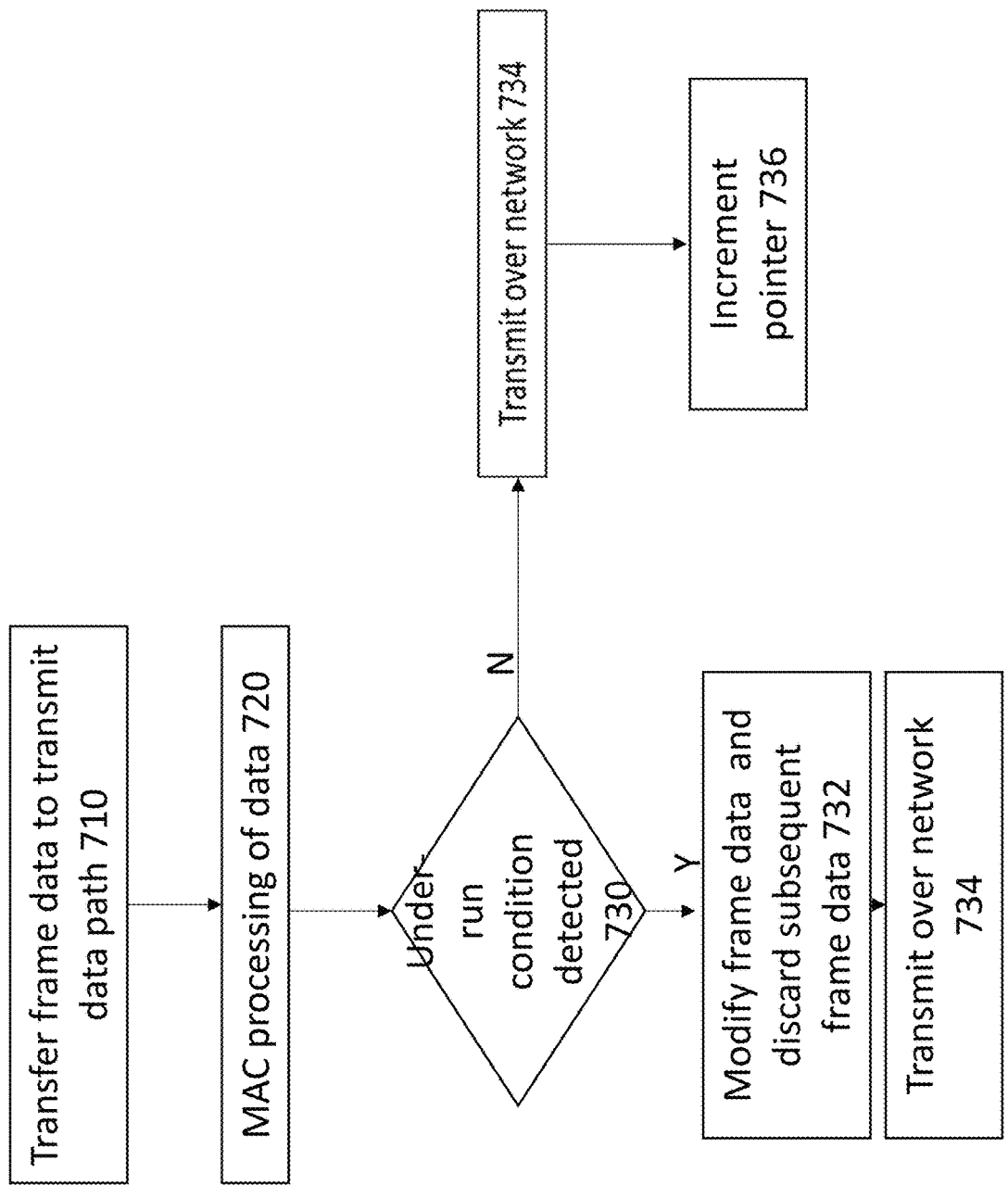
FIG. 6 is a flow chart illustrating processing of a data packet in the network interface device.

Reference is made to FIG. 6, which shows an example embodiment of the method which may be performed whilst the network interface device is receiving data from the host system.

At step 710, the frame data is transferred to the transmit data path 420 of the network interface device. This transfer may comprise a number of discrete memory transfers each of which transfers a portion of the frame. These transfers may arrive in any order and with arbitrary delays between any successive transfer. The resulting data packet may be assembled and stored in a buffer—which may be a FIFO or processing pipeline which is part of the transmit data path.

In step 720 there is MAC processing of the data. At step 730, the buffer monitoring unit determines whether or not the buffer is underrunning. This may comprise determining the percentage of the full capacity of the buffer which is occupied by data for transmission. If this percentage drops below a predefined value, the buffer monitoring unit may determine an underrun condition. Alternatively or additionally, this may comprise determining the rate at which data is received by the transmit data path 420 from the host system 201. If the rate at which data is received by the transmit data path 420 from the host system 201 falls below a predefined rate, the buffer monitoring unit determines an underrun condition.

If step 730 results in a determination that the buffer is not underrunning, the frame is transmitted over the network in step 734. The pointer or consumer index in the network interface device is incremented. The pointer associated with the descriptor table may thus be incremented to a new value, which points to the next queue entry of the send queue memory 210. The network interface device can then move on to process the next descriptor in the queue. The method will then be repeated for the next frame.

If step 730 results in a determination that the buffer is underrunning, the method proceeds to step 732 where one or more frame bits are modified, as discussed previously. In step 734, the modified frame is transmitted over the network. The detection of an underrun condition at step 730 may additionally result in any subsequent data which may arrive at step 710 for that given frame to be discarded rather than be transferred to the MAC.

Thus a corrupted frame is transmitted in the case of an underflow. The frame is corrupted in that there is not enough data due to the underrunning. The buffer monitor unit will cause the corrupted frame to be marked so it is recognised as bad. In particular, the buffer monitor will cause the frame to be marked so that in some embodiments, the frame is recognised as deliberately corrupted. The pointer associated with the descriptor table may thus be not incremented to a new value which would indicate that the transmission of the frame data is to be re-initiated.

In the case of a re-initiation of the transmission it is not required that another doorbell be written since the send queue contains a descriptor which points to the data in memory.

The network interface device then reads the one or more descriptors in the queue, which is identified by the index value contained in the doorbell. The network interface device then retrieves the data from the memory which is pointed to by the one or more descriptors retrieved from the queue.

In the case of a re-initiation of transmission the transfer of frame data to the MAC, step 720 may not be started until there is sufficient data available in the buffer to guarantee that an underflow condition will not re-occur.

Thus, there is a follow up with a re-transmission of the previously corrupted frame but now without underflow of the correct frame.

In some embodiments, transmission will only be initiated if there is a minimum number of bytes of data in the buffer. In some embodiments, the MAC processing will only commence when these minimum number of bytes of data are available. In some embodiments, the occurrence of underflow may be used to tune a parameter which enforces a delay on the draining of the buffer. This may for example be used to ensure that transmission to the MAC of a given frame is not started unless a minimum N bytes are available.

Some embodiments may be advantageous in that the system is dynamically responsive to the changes in the rate that data is provided to the network interface device.

In the described embodiments, the source of the data to be transmitted is a host computer. However it should be appreciated that the data may be received from any source of data. The source of data may be provided on the network interface device. For example, the source of data may be an entity such as an embedded processor on the network interface device which is producing data which may underrun.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device, said network interface device comprising: an input port configured to receive data for transmission in a data transmission path, said data for transmission to be sent on a physical medium over a network by said network interface device; and
    a processor and a memory, the memory storing instructions which, when executed by the processor, cause:
    monitoring said data transmission path to determine that an underrun condition is associated with said data transmission path;
    determining a cyclic redundancy check value for a packet to be transmitted on the physical medium;
    modifying only a part of said cyclic redundancy check value so as to enable a receiver to determine that said cyclic redundancy check value has been deliberately corrupted before transmitting the packet on the physical medium, wherein modifying only a part of said cyclic redundancy check value comprises replacing only some bits of said cyclic redundancy check value with some bits of a known value; and
    causing the packet to be transmitted to the receiver on the physical medium.

2. A network interface as claimed in claim 1, wherein said network interface device is configured to be coupled to source of said data for transmission.

3. A network interface as claimed in claim 1, wherein said source of said data comprises one or more of a host computing device and a source on said network interface device.

4. A network interface device as claimed in claim 1, further comprising a medium access control function, wherein said memory further stores instructions which, when executed by the processor cause said medium access control function to cause said cyclic redundancy check value to be provided in said packet.

5. A network interface device as claimed in claim 1, further comprising a physical layer function, wherein said memory further stores instructions which, when executed by the processor cause said cyclic redundancy check value to be provided in said packet.

6. A network interface device as claimed in claim 1, wherein said memory storing instructions which, when executed by the processor, cause said data for transmission to be retransmitted.

7. A network interface device as claimed in claim 6, wherein said memory further stores instructions which, when executed by the processor, cause said retransmission if there is no underrun condition associated with the data transmission path for the data to be retransmitted.

8. A network interface device as claimed in claim 1, further comprising consumer queue information comprising a pointer which is incremented in response to transmission of a packet, wherein said memory storing instructions which, when executed by the processor, cause the pointer not to be incremented if said packet to be transmitted comprises said indication.

9. A network interface device as claimed in claim 1, wherein said memory storing instructions which, when executed by the processor, cause determining an underrun condition associated with said transmit data path in response to one of:
a data rate of data being received being less than a threshold rate; and
a quantity of data in said data transmission path being less than a threshold amount.

10. A network interface device as claimed in claim 1, wherein data transmission path comprises a buffer, said data transmission path being configured such that transmission of data starts when at least N bytes of data is in said buffer.

11. A network interface device as claimed in claim 10, wherein said buffer is configured such that the value of N is adjustable.

12. A network interface device as claimed in claim 11, wherein said buffer is configured such that the value of N is adjustable in response to at least one occurrence of an underrun condition.

13. A network interface device as claimed in claim 1, said network interface device being configured to receive a frame using load store operations to said transmission data path, which is configured to drain at a rate dependent on a network link speed.

14. A network interface device as claimed in claim 1, said network interface device being configured to delay transfer of data through said data transmit transmission path for at least one of a predetermined time and until predetermined amount of data has been received.

15. A receiver comprising:
an input port configured to receive data packets over a network on a physical medium; and
a circuit configured to determine for each packet if said packet comprises a cyclic redundancy check value with only a part modified by a transmitter, wherein modifying only a part of said cyclic redundancy check value comprises replacing only some bits of said cyclic redundancy check value with some bits of a known value, so as to enable the receiver to determine that said cyclic redundancy check value has been deliberately corrupted before transmitting the packet on the physical medium, and to discard any packet with said cyclic redundancy check value with only a part modified by the transmitter.

16. A receiver comprising:
an input port configured to receive data packets over a network on a physical medium; and
a processor and a memory, the memory storing instructions which, when executed by the processor, cause determining for each packet if said packet comprises a cyclic redundancy check value with only a part modified by a transmitter, wherein modifying only a part of said cyclic redundancy check value comprises replacing only some bits of said cyclic redundancy check value with some bits of a known value, so as to enable the receiver to determine that said cyclic redundancy check value has been deliberately corrupted before transmitting the packet on the physical medium, and to discard any packet with said cyclic redundancy check value with only a part modified by the transmitter.

17. A method comprising:
receiving data for transmission, said data for transmission to be sent over a network on a physical medium by a network interface device;
monitoring said data to determine that an underrun condition is associated with said data for transmission;
determining a cyclic redundancy check value for a packet to be transmitted on the physical medium;
modifying only a part of said cyclic redundancy check value so as to enable a receiver to determine that said cyclic redundancy check value has been deliberately corrupted before transmitting the packet on the physical medium, wherein modifying only a part of said cyclic redundancy check value comprises replacing only some bits of said cyclic redundancy check value with some bits of a known value; and
causing the packet to be transmitted to the receiver on the physical medium.

18. A network interface device, said network interface device comprising:
an input port configured to receive data for transmission in a data transmission path, said data for transmission to be sent on a physical medium over a network by said network interface device; and
a processor and a memory, the memory storing instructions which, when executed by the processor, cause:
monitoring said data transmission path to determine that an underrun condition is associated with said data transmission path;
modifying part of a packet to be transmitted on a physical medium, wherein modifying part of a packet to be transmitted on a physical medium comprises modifying data included in the packet to be transmitted to obtain modified data used for determining a cyclic redundancy check value;
determining a cyclic redundancy check value for the packet to be transmitted on the physical medium so as to enable a receiver to determine that said cyclic redundancy check has been deliberately corrupted before transmitting the packet on the physical medium; and causing the packet to be transmitted to the receiver on the physical medium.

\* \* \* \* \*